US012384908B2

(12) United States Patent
Birukawa et al.

(10) Patent No.: US 12,384,908 B2
(45) Date of Patent: Aug. 12, 2025

(54) MULTILAYER POLYPROPYLENE FILM FOR CAPACITOR

(71) Applicant: PRIME POLYMER CO., LTD., Tokyo (JP)

(72) Inventors: Jun Birukawa, Ichihara (JP); Satoshi Tamura, Sodegaura (JP); Hiroki Shimizu, Chiba (JP)

(73) Assignee: PRIME POLYMER CO., LTD., Tokyo (JP)

( * ) Notice: Subject to any disclaimer, the term of this patent is extended or adjusted under 35 U.S.C. 154(b) by 170 days.

(21) Appl. No.: 17/908,896

(22) PCT Filed: Feb. 3, 2021

(86) PCT No.: PCT/JP2021/003914

§ 371 (c)(1),
(2) Date: Sep. 1, 2022

(87) PCT Pub. No.: WO2021/176930

PCT Pub. Date: Sep. 10, 2021

(65) Prior Publication Data

US 2023/0088053 A1 Mar. 23, 2023

(30) Foreign Application Priority Data

Mar. 6, 2020 (JP) ................................ 2020-038760

(51) Int. Cl.

| | |
|---|---|
| ***C08L 23/12*** | (2006.01) |
| ***B32B 27/08*** | (2006.01) |
| ***B32B 27/32*** | (2006.01) |
| ***C08F 110/06*** | (2006.01) |
| *H01G 2/08* | (2006.01) |

(52) U.S. Cl.

CPC .............. *C08L 23/12* (2013.01); *B32B 27/08* (2013.01); *B32B 27/32* (2013.01); *C08F 110/06* (2013.01); *B32B 2250/242* (2013.01); *B32B 2307/414* (2013.01); *B32B 2307/538* (2013.01); *B32B 2457/16* (2013.01); *H01G 2/08* (2013.01)

(58) Field of Classification Search

CPC ......... C08L 23/12; B32B 27/08; B32B 27/32; B32B 2250/242; B32B 2307/414; B32B 2307/538; B32B 2457/16; C08F 110/06; H01G 2/08

See application file for complete search history.

(56) References Cited

U.S. PATENT DOCUMENTS

| | | | | |
|---|---|---|---|---|
| 9,595,388 | B2 | 3/2017 | Gloger et al. | |
| 10,256,041 | B2 | 4/2019 | Tamura et al. | |
| 10,800,909 | B2 | 10/2020 | Ohta | |
| 11,021,597 | B2 | 6/2021 | Gitsas et al. | |
| 2013/0303684 | A1 | 11/2013 | Gloger et al. | |
| 2017/0190891 | A1 | 7/2017 | Ohta | |
| 2018/0286588 | A1* | 10/2018 | Tamura | C08K 5/1575 |
| 2018/0298172 | A1* | 10/2018 | Gitsas | C08J 5/18 |
| 2018/0362746 | A1 | 12/2018 | Wang et al. | |

FOREIGN PATENT DOCUMENTS

| | | | | |
|---|---|---|---|---|
| EP | 3 196 234 | A1 | 7/2017 | |
| JP | 62-275143 | A | 11/1987 | |
| JP | 2002-154187 | A | 5/2002 | |
| JP | 5586784 | B2 | 9/2014 | |
| JP | 2015-201616 | A | 11/2015 | |
| JP | 2016-141014 | A | 8/2016 | |
| JP | 2017-222759 | A | 12/2017 | |
| JP | 2018-001450 | A | 1/2018 | |
| JP | 2018-538373 | A | 12/2018 | |
| KR | 10-1932396 | B1 | 3/2019 | |
| WO | WO-2016/017753 | A1 | 2/2016 | |
| WO | WO-2016043217 | A1 * | 3/2016 | B32B 27/32 |
| WO | WO-2016/159044 | A1 | 10/2016 | |

OTHER PUBLICATIONS

[NPL-1] Imanishi et al. (WO 2016/043217 A1); Mar. 24, 2016 (EPO machine translation to English). (Year: 2016).*
[NPL-2] "[Technical Data] Surface Roughness JIS B0601 (1994)"; pp. 3541; <https://us.misumi-ec.com/pdf/tech/mech/US2010_fa_p3541_3542.pdf?srsltid=AfmBOop4v_7NYSfSETTy8rTIPxd8CRj3E7gOVZKzkbQngvlaLzsT8xCc>. (Year: 2024).*

* cited by examiner

*Primary Examiner* — Donald M Flores, Jr.
(74) *Attorney, Agent, or Firm* — Foley & Lardner LLP

(57) ABSTRACT

An object of the present invention is to provide a film for a capacitor such that the film excels in high-temperature dielectric breakdown voltage (high-temperature BDV) and has blocking resistance, and bleeding-out of, for instance, a nucleating agent is suppressed even after long-term storage. The present invention pertains to a multilayer polypropylene film for a capacitor, the film including a base layer composed of a propylene polymer composition containing a propylene homopolymer (X) and 0.0001 to 0.05 mass % of a polymer-based α-crystal nucleating agent (C), and a front layer or a back layer composed of a propylene-based polymer (Y) on at least one surface of the base layer, wherein the base layer and the front layer or back layer are stretched.

5 Claims, No Drawings

MULTILAYER POLYPROPYLENE FILM FOR CAPACITOR

CROSS-REFERENCE TO RELATED APPLICATIONS

The present application claims priority under 37 U.S.C. § 371 to International Patent Application No. PCT/JP2021/003914, filed Feb. 3, 2021, which claims priority to and the benefit of Japanese Patent Application No. 2020-038760, filed on Mar. 6, 2020. The contents of these applications are hereby incorporated by reference in their entireties.

TECHNICAL FIELD

The present invention relates to a polypropylene film for a capacitor.

BACKGROUND ART

Biaxially stretched polypropylene films are excellent in, for example, mechanical properties, heat resistance, chemical stability, and insulation properties, and are thus widely used not only for packaging or tape applications, but also as films for capacitors. The films for capacitors have increasing demands in the fields of, in particular, automobiles and/or home appliances, for example. Then, the films are desired to be further miniaturized, have a higher capacity, and be highly reliable. In particular, in the case of using a capacitor with high output as in hybrid car and electric vehicle applications, a large current flows through a circuit such as a transistor and/or a capacitor, and the use temperature increases. Thus, voltage endurance of the capacitor under a high temperature is also required.

Various improved methods have been proposed as methods for improving a property of a film for a capacitor, including, for example: a method for improving heat resistance by increasing a thermal deformation temperature of a biaxially stretched film by adding an $\alpha$ nucleating agent to polypropylene with excellent tacticity (e.g., Patent Documents 1 and 2); a method for improving high voltage endurance and dielectric breakdown property of a biaxially stretched film at a high temperature by adding an organic nucleating agent to polypropylene (Patent Document 3); and a method for making surface glossiness increased to 140% or higher by layering a surface layer, which is obtained by adding silica particles to polypropylene with excellent tacticity, on at least one surface of a biaxially stretched film obtained by adding an $\alpha$ nucleating agent to polypropylene with excellent tacticity (Patent Document 4).

However, in all of the methods, the effect of improving the high-temperature dielectric breakdown voltage (high-temperature BDV) is still insufficient. When an organic nucleating agent is added, the organic nucleating agent may bleed out to the surface of the biaxially stretched film. In addition, the bleeding material may contaminate production equipment including cast rolls.

CITATION LIST

Patent Documents

Patent Document 1: JP 5586784 B2
Patent Document 2: JP 2018-538373 A
Patent Document 3: JP 2015-201616 A
Patent Document 4: WO 2016/043217

SUMMARY OF INVENTION

Technical Problem

An object of the present invention is to provide a film for a capacitor such that the film excels in high-temperature dielectric breakdown voltage (high-temperature BDV) and has blocking resistance, and bleeding-out of, for instance, a nucleating agent is suppressed even after long-term storage.

Solution to Problem

The present invention pertains to a multilayer polypropylene film for a capacitor, the film including a base layer composed of a propylene polymer composition containing a propylene homopolymer (X) and 0.0001 to 0.05 mass % of a polymer-based $\alpha$-crystal nucleating agent (C), and a front layer or a back layer composed of a propylene-based polymer (Y) on at least one surface of the base layer, wherein both of the base layer, and the front layer or the back layer are stretched.

Advantageous Effects of Invention

A multilayer polypropylene film for a capacitor according to the present invention is a multilayer film including a polymer-based $\alpha$-crystal nucleating agent-containing base layer and a front layer and/or a back layer composed of a propylene-based polymer composition (the front layer and the back layer each refer to a layer in contact with the base layer). Thus, it is possible to suppress bleeding-out of an $\alpha$-crystal nucleating agent even after long-term storage. In addition, the multilayer polypropylene film having large surface roughness can impart blocking resistance. The spherulite size in the multilayer polypropylene film is also made smaller, and voids are thus suppressed. Here, both high-temperature BVD and blocking resistance can be established.

DESCRIPTION OF EMBODIMENTS

Hereinafter, the present invention will be described in detail.

[Propylene Homopolymer (X)]

The propylene homopolymer (X), which is one of components contained in the propylene polymer composition used to form the base layer of the multilayer polypropylene film for a capacitor according to the present invention, is a homopolymer of propylene, and preferably satisfies the following requirements (1) to (5).

<Requirement (1)>

The propylene homopolymer (X) has a melt flow rate (MFR) (ASTM D1238, at 230° C., under a load of 2.16 kg) of in the range of 1 to 10 g/10 min, preferably 2 to 6 g/10 min, and more preferably 2.5 to 5 g/10 min. When the MFR is less than 1.0 g/10 min, it is difficult to mold a film original fabric with an extruder. In addition, chuck displacement, for instance, occurs during film stretching. Thus, a desired multilayer polypropylene film for a capacitor is hard to obtain. When the MFR is more than 10.0 g/10 min, the productivity of the stretched multilayer film is significantly deteriorated. For example, the film is frequently broken during stretching. Note that the MFR can be adjusted by adjusting the hydrogenation amount during polymerization of the propylene homopolymer. The MFR can be determined by a procedure designated in Examples described later.

<Requirement (2)>

The propylene homopolymer (X) has a meso pentad fraction (mmmm) determined by $^{13}$C-NMR of in the range of 0.930 to 0.999, preferably 0.940 to 0.998, and more preferably 0.950 to 0.997.

By using a propylene homopolymer having the mmmm fraction within the above range, the obtained multilayer polypropylene film for a capacitor is excellent in high-temperature voltage endurance. Here, the meso pentad fraction indicates the proportion of quintuplet isotactic structures present in the molecular chain, and is the fraction of propylene structural units at the center of a sequence composed of five consecutive meso-propylene monomer units. The meso pentad fraction can be determined by a procedure designated in Examples described later.

<Requirement (3)>

The propylene homopolymer (X) has an ash content of 50 ppm by mass or less, preferably 20 ppm by mass or less, and more preferably 10 ppm by mass or less.

When the ash content is more than 50 ppm by mass, not only the voltage endurance of the resulting multilayer polypropylene film for a capacitor is lowered, but also long-term capacitor characteristics are deteriorated. The ash content is determined by putting pellets in a crucible, completely burning the pellets, allowing the pellets to be ash in the crucible at 800° C. for 2 h in an electric furnace, measuring the ash remaining in the crucible, and calculating the ash content (ppm).

The ash is a component derived from an olefin polymerization catalyst contained in the propylene homopolymer. The propylene homopolymer having a low ash content can be produced by using a highly active catalyst or decomposing and/or removing the catalyst in the polymerized propylene homopolymer.

<Requirement (4)>

The propylene homopolymer (X) has a chlorine content of 2 ppm by mass or less, preferably 1.5 ppm by mass or less, and more preferably 1.2 ppm by mass or less.

When the chlorine content is more than 2 ppm by mass, not only the voltage endurance of the resulting multilayer polypropylene film for a capacitor is lowered, but also long-term capacitor characteristics are deteriorated. It is understood that, when the capacitor is used, the electric field at or near chlorine ions inside the film locally increases, and dielectric breakdown is likely to occur therefrom, resulting in decrease in the withstand voltage. The chlorine is derived from a catalyst used in homopolymerization of propylene. By controlling the type and amount of the catalyst to be used and subjecting the propylene homopolymer to post-treatment, it is possible to control the chlorine content to be within the above range.

The chlorine content can be determined in the following manner: 0.8 g of propylene homopolymer is burned at 400 to 900° C. under an argon/oxygen stream while using a combustor manufactured by Mitsubishi Kasei Corporation, a combustion gas is then collected with ultrapure water and a resulting mixture is concentrated, to give a sample solution, and the concentrated sample solution is measured with an anion column AS4A-SC (manufactured by Dionex Corporation) using a DIONEX-DX 300 type ion chromatography measuring apparatus, manufactured by Nippon Dionex K.K. The chlorine is a component derived from an olefin polymerization catalyst contained in the propylene homopolymer. The propylene homopolymer having a low chlorine content can be obtained by using a highly active catalyst or by washing with a suitable solvent to remove chlorine in the polymerized propylene homopolymer.

<Requirement (5)>

The propylene homopolymer (X) has a ratio (Mw/Mn) of the weight average molecular weight (Mw) to the number average molecular weight (Mn) as measured by gel permeation chromatography (GPC) being in the range of 4.5 to 12.0, preferably 4.5 to 11.0, and more preferably 4.5 to 10.5.

When the Mw/Mn is 4.5 or more, excellent stretchability is obtained when a stretched film is molded, and a uniform film is easily obtained. When the Mw/Mn is 12.0 or less, the content of a low-molecular-weight component contained in the propylene homopolymer is small. For instance, stickiness is suppressed during film molding, which is preferable in terms of moldability. That is, when the Mw/Mn is within the above range, it is preferable from the viewpoint of moldability and stretchability of the propylene homopolymer and uniformity of the thickness of the resulting capacitor film. The Mw/Mn can be determined by a procedure designated in Examples described later.

The propylene homopolymer (X) satisfying the above-described requirements (1) to (5) can be obtained, for example, by polymerizing propylene in the presence of an olefin polymerization catalyst described later.

Note that, as described below, the propylene homopolymer (X) in the present invention includes a propylene homopolymer (X1) and a propylene homopolymer (X2).

<Olefin Polymerization Catalyst>

The olefin polymerization catalyst used for producing the propylene homopolymer (X) in the present invention is not particularly limited as long as the propylene homopolymer can be obtained. Examples include: a catalyst [A] including (i) a solid titanium catalyst component containing magnesium, titanium, a halogen, and an electron donor and satisfying the following requirements (k1) to (k4), (ii) an organosilicon compound component represented by the formula (II) below, and (iii) an organometallic compound component containing an element belonging to Group 1, Group 2, or Group 13 of the periodic table; and a catalyst [B] including a prepolymerization catalyst (p) obtained by prepolymerizing propylene in the catalyst [A], (ii) the organosilicon compound component, and (iii) the organometallic compound component.

(k1) Having a titanium content of 2.5 mass % or less.

(k2) Having a content of the electron donor of from 8 to 30 mass %.

(k3) Having electron donor/titanium (mass ratio) of 7 or more.

(k4) Not substantially allowing titanium to be desorbed by hexane washing at room temperature.

$$R^1Si(OR^2)_2(NR^3R^4) \quad (II)$$

wherein $R^1$ represents a secondary or tertiary $C_{1-20}$ hydrocarbon group, $R^2$ represents a $C_{1-4}$ hydrocarbon group, $R^3$ represents a $C_{1-12}$ hydrocarbon group or a hydrogen atom, and $R^4$ represents a $C_{1-12}$ hydrocarbon group.

Hereinafter, each component constituting the olefin polymerization catalyst will be described.

<<Solid Titanium Catalyst Component (i)>>

The solid titanium catalyst component (i) can be prepared by the method including the step of bringing, into contact, (a) solid titanium which includes magnesium, titanium, a halogen, and an electron donor and from which titanium is not desorbed by hexane washing at room temperature, (b) an aromatic hydrocarbon, (c) liquid titanium, and (d) an electron donor.

(a) Solid Titanium

The solid titanium (a) can be produced by a known method for preparing a solid titanium catalyst component (see, for example, JP H4-096911 A, JP 58-83006 A, and JP H8-143580 A) by bringing, for instance, a magnesium compound, a titanium compound, and an electron donor (internal donor) into contact with one another by various procedures.

The magnesium compound is preferably used in a solid state. The magnesium compound in the solid state may be one in which the magnesium compound itself is in a solid state, or may be an adduct with an electron donor. Examples of the magnesium compound include magnesium compounds described in JP 2004-2742 A, specifically, such as magnesium chloride, ethoxy magnesium chloride, and butoxy magnesium. Meanwhile, examples of the electron donor include a compound having a magnesium compound solubilizing ability described in JP 2004-2742 A. Specific examples thereof include alcohols, aldehydes, amines, carboxylic acids, and mixtures thereof. The amount of the magnesium compound and the electron donor used depends on, for example, the kind thereof and/or the contact conditions thereof. However, the magnesium compound can be used in an amount of 0.1 to 20 mol/L and preferably 0.5 to 5 mol/L based on the liquid electron donor.

The titanium compound is preferably used in a liquid state. Examples of such a titanium compound include a tetravalent titanium compound represented by the following formula (III):

$$Ti(OR^5)_gX_{4-g} \quad (III)$$

wherein $R^5$ is a hydrocarbon group, X is a halogen atom, and $0 \le g \le 4$.

The titanium compound is particularly preferably titanium tetrachloride. In addition, two or more kinds of the titanium compounds may be used in combination.

Examples of the electron donor (internal donor) include a compound represented by the following formula (IV) (hereinafter, also referred to as "compound (IV)").

[Chemical Formula 1]

(IV)

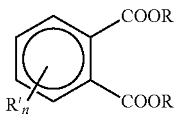

wherein R represents a linear or branched alkyl group having 1 to 10, preferably 2 to 8, and more preferably 3 to 6 carbon atoms, R' represents a $C_{1-10}$ linear or branched alkyl group, and n represents an integer of 0 to 4. In the present invention, a compound in which n is 0 is preferred.

Examples of the alkyl group of R or R' include a methyl group, an ethyl group, an n-propyl group, an iso-propyl group, an n-butyl group, an iso-butyl group, a tert-butyl group, a pentyl group, a hexyl group, a heptyl group, an octyl group, a nonyl group, and a decyl group.

Specific examples of the compound (IV) include dimethyl phthalate, methyl ethyl phthalate, diethyl phthalate, n-propyl phthalate, diisopropyl phthalate, di-n-butyl phthalate, diisobutyl phthalate, di-n-pentyl phthalate, dineopentyl phthalate, di-n-hexyl phthalate, di-n-heptyl phthalate, di(methylhexyl)phthalate, di(dimethylpentyl)phthalate, di(ethylpentyl)phthalate, di(2,2,3-trimethylbutyl)phthalate, di-n-octyl phthalate, and di-2-ethylhexyl phthalate. Among them, diisobutyl phthalate is particularly preferable.

In the present invention, an electron donor other than the compound (IV) may be used as the electron donor (internal donor). Examples of the electron donor other than the compound (IV) include a compound having two or more ether bonds present via a plurality of atoms (hereinafter, also referred to as a "polyether compound").

Examples of the polyether compound include a compound in which an atom present between ether bonds is carbon, silicon, oxygen, nitrogen, sulfur, phosphorus, boron, or two or more kinds of atoms selected therefrom. Among them, preferred is a compound in which a relatively bulky substituent is bonded to an atom between ether bonds and a plurality of carbon atoms are contained in atoms present between two or more ether bonds. For example, a polyether compound represented by the following formula (3) is preferable.

[Chemical Formula 2]

(3)

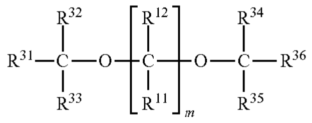

In the formula (3), m is an integer of 1 to 10, preferably an integer of 3 to 10, and more preferably an integer of 3 to 5. $R^{11}$, $R^{12}$, and $R^{31}$ to $R^{36}$ are each independently a hydrogen atom or a substituent having at least one element selected from carbon, hydrogen, oxygen, fluorine, chlorine, bromine, iodine, nitrogen, sulfur, phosphorus, boron, and silicon. $R^{11}$ and $R^{12}$ are each independently preferably a $C_{1-10}$ hydrocarbon group and more preferably a $C_{2-6}$ hydrocarbon group. $R^{31}$ to $R^{36}$ are each independently preferably a hydrogen atom or a $C_{1-6}$ hydrocarbon group.

Specific examples of $R^{11}$ or $R^{12}$ include a methyl group, an ethyl group, an n-propyl group, an isopropyl group, an n-butyl group, an isobutyl group, an isopentyl group, a neopentyl group, a hexyl group, a heptyl group, an octyl group, a 2-ethylhexyl group, a decyl group, a cyclopentyl group, and a cyclohexyl group. Among them, an ethyl group, an n-propyl group, an isopropyl group, an n-butyl group, or an isobutyl group is preferable. Specific examples of any of $R^{31}$ to $R^{36}$ include a hydrogen atom, a methyl group, an ethyl group, an n-propyl group, an isopropyl group, an n-butyl group, and an isobutyl group. Among them, a hydrogen atom or a methyl group is preferable. Any of $R^{11}$, $R^{12}$, and $R^{31}$ to $R^{36}$ (preferably $R^{11}$, $R^{12}$) may together form a ring other than a benzene ring, and an atom other than carbon may be contained in the main chain.

Specific examples of the polyether compound include 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2-methyl-2-propyl-1,3-dimethoxypropane, 2-methyl-2-ethyl-1,3-dimethoxypropane, 2-methyl-2-isopropyl-1,3-dimethoxypropane, 2-methyl-2-cyclohexyl-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-s-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-cyclohexyl-2-cyclohexylmethyl-1,3-dimethoxypropane, 2,3-dicyclohexyl-1,4-diethoxybutane, 2,3-diisopropyl-1,4-diethoxybutane, 2,4-diisopropyl-1,5-dimethoxypentane, 2,4-diisobutyl-1,5-dimethoxypentane, 2,4-diisoamyl-1,5-dimethoxypentane, 3-methoxymethyltetrahydrofuran, 3-methoxymethyldioxane, 1,2-diisobutoxypropane, 1,2-diisobutoxyethane, 1,3-diisoamyloxyethane, 1,3-diisoamyloxypropane, 1,3-diisoneopentyloxyethane, 1,3-dineopentyloxypropane, 2,2-tetramethylene-1,3-dimethoxypropane, 2,2-pentamethylene-1,3-dimethoxypropane, 2,2-hexamethylene-1,3-dimethoxypropane, 1,2-bis(methoxymethyl)cyclohexane, 2-cyclohexyl-2-ethoxymethyl-1,3-diethoxypropane, 2-cyclohexyl-2-methoxymethyl-1,3-dimethoxypropane, 2,2-diisobutyl-1,3-dimethoxycyclohexane, 2-isopropyl-2-isoamyl-1,3-dimethoxycyclohexane, 2-cyclohexyl-2-methoxymethyl-1,3-dimethoxycyclohexane, 2-isopropyl-2-methoxymethyl-1,3-dimethoxycyclohexane, 2-isobutyl-2-methoxymethyl-1,3-dimethoxycyclohexane, 2-cyclohexyl-2-ethoxymethyl-1,3-diethoxycyclohexane, 2-cyclohexyl-2-ethoxymethyl-1,3-dimethoxycyclohexane, 2-isopropyl-2-ethoxymethyl-1,3-diethoxycyclohexane, 2-isopropyl-2-ethoxymethyl-1,3-dimethoxycyclohexane, 2-isobutyl-2-ethoxymethyl-1,3-diethoxycyclohexane, and 2-isobutyl-2-ethoxymethyl-1,3-dimethoxycyclohexane.

Among them, a 1,3-diether compound is preferable, and 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, or 2,2-bis(cyclohexylmethyl)1,3-dimethoxypropane is more preferable. These compounds may be used singly or two or more kinds thereof may be used in combination.

<<Preparation of Solid Titanium (a)>>

The solid titanium (a) can be prepared by bringing the magnesium compound, the titanium compound, and the electron donor into contact. At this time, it is preferable to use a solid magnesium compound suspended in a hydrocarbon solvent. When these components are brought into contact with one another, the liquid titanium compound may be used once to give a solid (1), or the liquid titanium compound may be further brought into contact with the obtained solid (1) to give a solid (2). Furthermore, it is preferable to prepare the solid titanium (a) after washing the solid (1) or (2) with a hydrocarbon solvent if necessary.

The contact of each component as described above is usually performed at a temperature of −70° C. to +200° C., preferably −50° C. to +150° C., and more preferably −30° C. to +130° C. The amount of each component used in preparing the solid titanium (a) depends on the preparation procedure and cannot be generally defined. However, for example, the electron donor can be used in an amount of 0.01 to 10 mol and preferably 0.1 to 5 mol, and the titanium compound can be used in an amount of 0.01 to 1000 mol and preferably 0.1 to 200 mol, based on 1 mol of the magnesium compound.

In the present invention, the solid (1) or (2) thus obtained can be used as it is as the solid titanium (i), but it is preferable to wash the solid with a hydrocarbon solvent at 0 to 150° C.

Examples of the hydrocarbon solvent used include an aliphatic hydrocarbon solvent (e.g., hexane, heptane, octane, nonane, decane, cetane), a non-halogenated aromatic hydrocarbon solvent (e.g., toluene, xylene, benzene), and a halogen-containing aromatic hydrocarbon solvent. Among them, an aliphatic hydrocarbon solvent or a halogen-free aromatic hydrocarbon solvent is preferably used.

At the time of washing the solid, the hydrocarbon solvent is usually used in an amount of 10 to 500 ml and preferably 20 to 100 ml, based on 1 g of the solid. The solid titanium (a) thus obtained contains magnesium, titanium, a halogen, and an electron donor. In the solid titanium (a), the electron donor/titanium (mass ratio) is preferably 6 or less.

In the solid titanium (a) thus obtained, titanium is not desorbed by hexane washing at room temperature.

(b) Aromatic Hydrocarbon

Examples of the aromatic hydrocarbon (b) used in contact with the solid titanium (a) include benzene, toluene, xylene, ethylbenzene, and a halogen-containing hydrocarbon thereof. Among them, xylene (particularly para-xylene) is preferable. By bringing the solid titanium (a) into contact with such an aromatic hydrocarbon (b), it is possible to reduce a so-called "excess titanium compound" that by-produces a component with low tacticity.

(c) Liquid Titanium

Examples of the liquid titanium (c) used in contact with the solid titanium (a) include titanium compounds the same as those used for preparing the solid titanium (a). Among them, titanium tetrahalide is preferable, and titanium tetrachloride is particularly preferable.

(d) Electron Donor

Examples of the electron donor (d) used in contact with the solid titanium (a) include electron donors the same as those exemplified for the electron donor (internal donor) described above. Among them, it is preferable to use the same electron donor used for preparing the solid titanium (a).

<<Method for Preparing Solid Titanium Catalyst Component (i)>>

The solid titanium (a), the aromatic hydrocarbon (b), the liquid titanium (c), and the electron donor (d) are brought into contact usually at a temperature of 110 to 160° C. and preferably 115° C. to 150° C. for 1 min to 10 h and preferably 10 min to 5 h.

In this contact, the aromatic hydrocarbon (b) is usually used in an amount of 1 to 10000 ml, preferably 5 to 5000 ml, and more preferably 10 to 1000 ml, based on 1 g of the solid titanium (a). The liquid titanium (c) is usually used in an amount within the range of 0.1 to 50 ml, preferably 0.2 to 20 ml, and particularly preferably 0.3 to 10 ml, based on 100 ml of the aromatic hydrocarbon (b). The electron donor (d) is usually used in an amount of 0.01 to 10 ml, preferably 0.02 to 5 ml, and particularly preferably 0.03 to 3 ml, based on 100 ml of the aromatic hydrocarbon (b).

The contact order of the solid titanium (a), the aromatic hydrocarbon (b), the liquid titanium (c), and the electron donor (d) is not particularly limited, and the solid titanium (a), the aromatic hydrocarbon (b), the liquid titanium (c), and the electron donor (d) can be brought into contact simultaneously or sequentially.

The solid titanium (a), the aromatic hydrocarbon (b), the liquid titanium (c), and the electron donor (d) are preferably brought into contact with one another under stirring in an inert gas atmosphere. For example, it is desirable that, in a stirrer-equipped glass flask purged with nitrogen sufficiently, a slurry of the solid titanium (a), the aromatic hydrocarbon (b), the liquid titanium (c), and the electron donor (d) is stirred with a stirrer at a rotation speed of 100 to 1000 rpm and preferably 200 to 800 rpm at the above-mentioned temperature for the above-mentioned time, to allow the solid titanium (a), the aromatic hydrocarbon (b), the liquid titanium (c), and the electron donor (d) to be brought into contact with one another.

The solid titanium (a) and the aromatic hydrocarbon (b) after contact can be separated by filtration.

By such contact between the solid titanium (a) and the aromatic hydrocarbon (b), the solid titanium catalyst component (i) having a titanium content lower than that of the solid titanium (a) is obtained. Specifically, it is possible to obtain the solid titanium catalyst component (i) having a titanium content less than that of the solid titanium (a) by 25 mass % or more, preferably 30 to 95 mass %, and more preferably 40 to 90 mass %.

The solid titanium catalyst component (i) obtained as described above contains magnesium, titanium, a halogen, and an electron donor, satisfies the following requirements (k1) to (k4), and preferably further satisfies the following requirement (k5).

(k1) Having a titanium content of the solid titanium catalyst component (i) being 2.5 mass % or less, preferably 2.2 to 0.1 mass %, more preferably 2.0 to 0.2 mass %, particularly preferably 1.8 to 0.3 mass %, and most preferably 1.5 to 0.4 mass %.

(k2) Having a content of the electron donor being 8 to 30 mass %, preferably 9 to 25 mass %, and more preferably 10 to 20 mass %.

(k3) Having an electron donor/titanium (mass ratio) of 7 or more, preferably 7.5 to 35, more preferably 8 to 30, and particularly preferably 8.5 to 25.

(k4) Regarding the solid titanium catalyst component (i), titanium is not substantially desorbed by hexane washing at room temperature. Note that the hexane washing of the solid titanium catalyst component (i) refers to washing 1 g of the solid titanium catalyst component (i) with hexane in an amount of usually 10 to 500 ml and preferably 20 to 100 ml for 5 min. The room temperature is from 15 to 25° C. The wording "titanium is not substantially desorbed" means that the concentration of titanium in the hexane washing solution is 0.1 g/L or less.

(k5) The solid titanium catalyst component (i) has an average particle size of 5 to 70 μm, preferably 7 to 65 μm, more preferably 8 to 60 μm, and particularly preferably 10 to 55 μm.

Here, the amounts of magnesium, halogen, titanium, and electron donor are each in mass % per unit mass of the solid titanium catalyst component (i). The magnesium, halogen, and titanium are quantified by plasma emission spectroscopy (ICP method), and the electron donor is quantified by gas chromatography. In addition, the average particle size of the catalyst is measured by a centrifugal sedimentation method using a decalin solvent.

When the solid titanium catalyst component (i) as described above is used as an olefin polymerization catalyst component, propylene can be highly actively polymerized. In addition, the production amount of propylene homopolymer with low tacticity is small. Thus, propylene homopolymer with high tacticity can be stably produced.

<<Organosilicon Compound Component (ii)>>

The organosilicon compound component (ii) included in the olefin polymerization catalyst in the present invention is represented by the following formula (II).

$$R^1Si(OR^2)_2(NR^3R^4) \quad (II)$$

wherein $R^1$ represents a secondary or tertiary $C_{1-20}$ hydrocarbon group, $R^2$ represents a $C_{1-4}$ hydrocarbon group, $R^3$ represents a $C_{1-12}$ hydrocarbon group or a hydrogen atom, and $R^4$ represents a $C_{1-12}$ hydrocarbon group.

Examples of $R^1$ include alicyclic hydrocarbon groups (e.g., a cyclobutyl group, a cyclopentyl group, a cyclopentenyl group, a cyclopentadienyl group, a cyclohexyl group, a cyclohexenyl group, and a substituted group thereof).

Examples of $R^1$ that is a hydrocarbon group in which carbon adjacent to Si is secondary carbon include an i-propyl group, an s-butyl group, an s-amyl group, and an α-methylbenzyl group, and examples of a hydrocarbon group in which carbon adjacent to Si is tertiary carbon include a tert-butyl group, a tert-amyl group, an α,α'-dimethylbenzyl group, and an adamantyl group.

Among them, a cyclopentyl group or a cyclobutyl group is preferable, and a cyclopentyl group is particularly preferable.

Examples of $R^2$ include a methyl group, an ethyl group, an n-propyl group, an iso-propyl group, an n-butyl group, an iso-butyl group, a tert-butyl group, a sec-butyl group, an n-pentyl group, an iso-pentyl group, a cyclopentyl group, an n-hexyl group, and a cyclohexyl group. Among them, a methyl group or an ethyl group is particularly preferable.

Examples of $R^3$ include hydrogen, a methyl group, an ethyl group, an n-propyl group, an iso-propyl group, an n-butyl group, an iso-butyl group, a tert-butyl group, a sec-butyl group, an n-pentyl group, an iso-pentyl group, a cyclopentyl group, an n-hexyl group, a cyclohexyl group, and an octyl group. Among them, an ethyl group is particularly preferable.

Examples of $R^4$ include a methyl group, an ethyl group, an n-propyl group, an iso-propyl group, an n-butyl group, an iso-butyl group, a tert-butyl group, a sec-butyl group, an n-pentyl group, an iso-pentyl group, a cyclopentyl group, an n-hexyl group, a cyclohexyl group, and an octyl group. Among them, an ethyl group is particularly preferable.

Specific examples of the organosilicon compound represented by the formula (II) include cyclopentyldiethylaminodimethoxysilane, cyclopentenyldiethylaminodimethoxysilane, cyclopentadienyldiethylaminodimethoxysilane, cyclohexyldiethylaminodimethoxysilane, isopropyldiethylaminodimethoxysilane, and tert-butyldiethylaminodimethoxysilane.

Among the organosilicon compounds represented by the formula (II), cyclopentyldiethylaminodimethoxysilane is preferable from the viewpoint of high tacticity, particularly, a long meso-chain length and an increase in the proportion of the amount eluted at a high temperature in cross fractionation chromatography (CFC).

One kind of the organosilicon compound component (ii) described above may be used singly, or two or more kinds thereof may be used in combination.

Use of combination of the solid titanium catalyst component (i) and the organosilicon compound component (ii) may give a propylene-based polymer having an unprecedented level of high tacticity.

<<Organometallic Compound Component (iii)>>

The organometallic compound component (iii) included in the olefin polymerization catalyst in the present invention is an organometallic compound containing a metal belonging to Group 1, Group 2, or Group 13 of the periodic table. Examples thereof include an organoaluminum compound, a complex alkyl compound of Group 1 metal and aluminum, and an organometallic compound of Group 2 metal. Note that two or more kinds of the organometallic compound component (iii) may be used in combination.

<Organoaluminum Compound>

The organoaluminum compound is represented by, for example, the following formula.

$R^a_n AlX_{3-n}$ wherein $R^a$ is a $C_{1-12}$ hydrocarbon group, X is a halogen or hydrogen, and n is from 1 to 3.

$R^a$ is a $C_{1-12}$ hydrocarbon group. Examples thereof include an alkyl group, a cycloalkyl group, and an aryl group. Specific examples thereof include methyl, ethyl, n-propyl, isopropyl, isobutyl, pentyl, hexyl, octyl, cyclopentyl, cyclohexyl, phenyl, and tolyl groups.

In addition, examples of the organoaluminum compound include a compound represented by the following formula:

$R^a_n AlY_{3-n}$ wherein $R^a$ is as described above; Y is a —$OR^b$ group, a —$OSiR^c_3$ group, a —$OAlR^d_2$ group, a —$NR^e_2$ group, a —$SiR^f_3$ group, or a —$N(R^g)AlR^h_2$ group; n is 1 to 2; $R^b$, $R^c$, $R^d$, and $R^h$ are each, for example, a methyl group, an ethyl group, an isopropyl group, an isobutyl group, a cyclohexyl group, or a phenyl group; $R^e$ is, for example, hydrogen, a methyl group, an ethyl group, an isopropyl group, a phenyl group, or a trimethylsilyl group; and $R^f$ and $R^g$ are each, for example, a methyl group or an ethyl group.

Specific examples of such an organoaluminum compound include the following compounds.

(1) A compound represented by $R^a_n Al(OR^b)_{3-n}$, such as dimethylaluminum methoxide, diethylaluminum ethoxide, or diisobutylaluminum methoxide.

(2) A compound represented by $R^a_n Al(OSiR^c)_{3-n}$, such as $Et_2Al(OSiMe_3)$, $(iso\text{-}Bu)_2Al(OSiMe_3)$, or $(iso\text{-}Bu)_2Al(OSiEt_3)$.

(3) A compound represented by $R^a_n Al(OAlR^d_2)_{3-n}$, such as $Et_2AlOAlEt_2$, or $(iso\text{-}Bu)_2AlOAl(iso\text{-}Bu)_2$.

Among the organic aluminum compounds as described above, an organic aluminum compound represented by $R^a_3Al$ is preferably used.

<Method for Producing Olefin Polymerization Catalyst>

The olefin polymerization catalyst can be produced by a method including a step of bringing the solid titanium catalyst component (i), the organosilicon compound component (ii), and the organometallic compound component (iii) into contact with one another.

In the present invention, when an olefin polymerization catalyst is formed from these components (i), (ii), and (iii), another component may be used as necessary.

In the present invention, a prepolymerization catalyst (p) may be formed from the above respective components. The prepolymerization catalyst (p) is formed by prepolymerizing an olefin (e.g., propylene) in the presence of the above-described respective components (i), (ii), and (iii) and another component(s) used as necessary. Such a prepolymerization catalyst (p) usually forms an olefin polymerization catalyst together with the organosilicon compound (ii) and the organometallic compound (iii), but the prepolymerization catalyst (p) can be used solely as an olefin polymerization catalyst in some cases.

<Method for Producing Propylene Homopolymer (X)>

In a method for producing the above-mentioned propylene homopolymer (X), propylene is polymerized in the presence of the above-described olefin polymerization catalyst.

In the present invention, the polymerization can be performed by either a liquid phase polymerization method (e.g., solution polymerization, suspension polymerization) or a gas phase polymerization method. Polymerization adopted may be slurry polymerization in a reactive form. In this case, an inert organic solvent can be used as a reaction solvent, or liquid propylene can also be used at a reaction temperature.

Specific examples of the inert organic solvent include an aliphatic hydrocarbon (e.g., propane, butane, pentane, hexane, heptane, octane, decane, dodecane, kerosene); an alicyclic hydrocarbon; an aromatic hydrocarbon; a halogenated hydrocarbon, and a material obtained by bringing them into contact. Among them, an aliphatic hydrocarbon is particularly preferably used.

During the polymerization, the solid titanium catalyst component (i) or the prepolymerization catalyst (p) is usually used in an amount of about $1\times10^{-5}$ to 1 mmol and preferably about $1\times10^{-4}$ to 0.1 mmol, in terms of titanium atoms per L of polymerization volume.

The organosilicon compound (ii) is usually used in an amount of about 0.001 mol to 10 mol and preferably 0.01 mol to 5 mol, based on 1 mol of metal atoms in the organometallic compound (iii).

The organometallic compound (iii) is used in an amount such that the amount of metal atoms in the compound (iii) is usually about 1 to 2000 mol and preferably about 2 to 500 mol, based on 1 mol of titanium atoms in the polymerization system.

Note that when the prepolymerization catalyst (p) is used during the polymerization, the organosilicon compound (ii) and/or the organometallic compound (iii) may not be added. When the olefin polymerization catalyst is formed from the prepolymerization catalyst (p), the component (ii), and the component (iii), these respective components (ii) and (iii) can be used in the amounts as described above.

When hydrogen is used during polymerization, the molecular weight of the resulting propylene homopolymer can be adjusted, and a polymer having a large MFR can be obtained.

In the present invention, the polymerization is usually carried out at a temperature of about 20 to 150° C. and preferably about 50 to 100° C. under normal pressure to 100 $kg/cm^2$ and preferably about 2 to 50 $kg/cm^2$.

In the present invention, the polymerization can be performed by any of a batch method, a semi-continuous method, or a continuous method. Further, the polymerization may be performed in two or more stages under different reaction conditions.

<Polymer-Based α-Crystal Nucleating Agent (C)>

The polymer-based α-crystal nucleating agent (C) contained in the propylene polymer composition for forming the base layer of the multilayer polypropylene film for a capacitor according to the present invention is a nucleating agent composed of a polymer, preferably a polymer produced by prepolymerization of a catalyst used for obtaining a propylene homopolymer, more preferably a polymer having a glass transition temperature and/or a melting point (Tm) of 200° C. or higher, and still more preferably a polymer having that of 280° C. or higher.

Since the polymer-based α-crystal nucleating agent (C) in the present invention is finely dispersed on the sub-nanometer order by being produced by prepolymerization, the nucleating agent effects are exhibited by a very small amount of the polymer-based α-crystal nucleating agent (C). When the glass transition temperature and/or the melting point (Tm) is 200° C. or higher, the spherulite size of the propylene homopolymer is small and the crystallinity is high, so that the nucleating agent effects are excellent. When the temperature is 280° C. or higher, these effects are further pronounced.

<Polymer Produced by Prepolymerization>

The polymer produced by prepolymerization in the present invention is an olefin polymer formed by prepolymerization of a catalyst for polymerizing propylene. As the olefin to be used for the preparation of the prepolymerization catalyst component, a compound represented by the formula (i) or (ii) below is used. Specific examples thereof include a branched olefin (e.g., 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, a vinylnaphthalene compound, an allyltoluene compound, allylbenzene, vinylcyclohexane, vinylcyclopentane, vinylcycloheptane, or an allyltrialkylsilane compound). The resulting olefin polymer has a glass transition temperature and/or a crystal melting point of 200° C. or higher.

[Chemical Formula 3]

$H_2C{=}CH{-}X$ (i)

$H_2C{=}CH{-}CH_2{-}X$ (ii)

(wherein X represents a cycloalkyl group, an aryl group, or

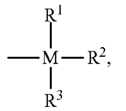

M represents carbon or silicon, $R^1$ and $R^2$ each represent a hydrocarbon group, and $R^3$ represents hydrogen or a hydrocarbon group.)

<Propylene Polymer Composition>

The propylene polymer composition constituting the base layer of the multilayer polypropylene film for a capacitor according to the present invention is a composition containing the propylene homopolymer (X) and 0.0001 to 0.05 mass %, preferably 0.0001 to 0.03 mass %, and more preferably 0.0001 to 0.01 mass % of the polymer-based α-crystal nucleating agent (C) (provided that the total amount of the propylene homopolymer (X) and the polymer-based α-crystal nucleating agent (C) is 100 mass %).

The propylene polymer composition in the present invention is obtained by mixing the propylene homopolymer (X) and the polymer-based α-crystal nucleating agent (C) within the above range. An olefin polymer (polymer-based α-crystal nucleating agent) produced by prepolymerizing an olefin represented by the formula (i) or (ii) in the method for producing an olefin polymerization catalyst at the time of production of the propylene homopolymer (X) is particularly preferable because it is finely dispersed in the propylene homopolymer (X1) as a prepolymerization catalyst.

As described above, in the propylene polymer composition in the present invention, a propylene polymer composition in which an olefin polymer (polymer-based α-crystal nucleating agent) produced by prepolymerizing an olefin represented by the above formula (i) or (ii) is finely dispersed in a propylene homopolymer (X1) may be used alone as a prepolymerization catalyst. However, a propylene homopolymer (X2), which is obtained by using an olefin other than the compound represented by the formula (i) or (ii), for example, an olefin such as propylene, as a prepolymerization catalyst (p) in the method for producing a propylene homopolymer (X), may be blended into a propylene homopolymer (X1) containing the olefin polymer (polymer-based α-crystal nucleating agent). Thus, the amount of the polymer-based α-crystal nucleating agent contained can be adjusted and used, if appropriate.

In the propylene polymer composition in the present invention, additives (e.g., a weather resistance stabilizer, a heat resistance stabilizer, an antistatic agent, an antislip agent, an antiblocking agent, an antifogging agent, a lubricant, a pigment, a dye, a plasticizer, an antiaging agent, a hydrochloric acid absorber, an antioxidant) may be added as long as an object of the present invention is not impaired. Preferably, various additives such as various antioxidants (e.g., Irganox 1010, BHT (dibutylhydroxytoluene), Irgafos 168) and/or calcium stearate are, for example, added and blended by melt extrusion in the range of 180 to 280° C.

[Propylene-Based Polymer (Y)]

The propylene-based polymer used to form the front layer of the multilayer polypropylene film for a capacitor according to the present invention may be the propylene homopolymer (X) for forming the base layer or a random copolymer containing usually 8 mol % or less and preferably 6 mol % or less of a $C_{2-8}$ olefin such as ethylene or an α-olefin having 4 or more carbon atoms (e.g., 1-butene, 1-pentene, 1-hexene, 4-methyl-1-pentene, 3-methyl-1-pentene, 1-octene, or 3-methyl-1-butene).

The propylene-based polymer (Y) in the present invention preferably satisfies the above requirements (1) to (5), which are met by the propylene homopolymer (X) for forming the base layer.

Nevertheless, in a case that the propylene homopolymer (X) is used as the front layer or the back layer of the multilayer polypropylene film for a capacitor according to the present invention, the propylene-based polymer (Y) used is a polymer-based α-crystal nucleating agent (C)-free polymer such as the propylene homopolymer (X2), or when the polymer-based α-crystal nucleating agent (C) is contained, the propylene-based polymer (Y) used is a propylene homopolymer having a content of the polymer-based α-crystal nucleating agent (C) being less than 0.00001 mass %.

Note that the propylene-based polymer (Y) in the present invention may be used for the front layer and the back layer of the multilayer polypropylene film for a capacitor. In this case, the propylene-based polymer (Y) used for the front layer and the propylene-based polymer (Y) used for the back layer may be the same. However, the propylene-based polymers (Y) may have different characteristics as long as each propylene-based polymer (Y) has the above properties.

The propylene-based polymer (Y) in the present invention can be produced by the method for producing a propylene homopolymer (X), but can also be produced by various known production procedures.

In the propylene-based polymer (Y) for forming the front layer and/or the back layer of the multilayer polypropylene film for a capacitor according to the present invention, additives (e.g., a weather resistance stabilizer, a heat resistance stabilizer, an antistatic agent, an antislip agent, an antiblocking agent, an antifogging agent, a lubricant, a pigment, a dye, a plasticizer, an antiaging agent, a hydrochloric acid absorber, an antioxidant) may be added as long as an object of the present invention is not impaired. Preferably, various additives such as various antioxidants (e.g., Irganox 1010, BHT (dibutylhydroxytoluene), Irgafos 168) and/or calcium stearate are, for example, added and blended by melt extrusion in the range of 180 to 280° C.

[Multilayer Polypropylene Film for Capacitor]

A multilayer polypropylene film for a capacitor according to the present invention is a multilayer film including a base layer composed of a propylene polymer composition containing the above propylene homopolymer (X) and 0.0001 to 0.05 mass % of a polymer-based α-crystal nucleating agent (C), and a front layer or a back layer composed of a propylene-based polymer (Y) on at least one surface of the base layer, wherein both of the base layer, and the front layer or the back layer are stretched.

The multilayer polypropylene film for a capacitor according to the present invention preferably has a front layer on one side of the base layer and a back layer on the other side of the base layer.

The total thickness of the multilayer film is usually in the range of 1 to 20 μm, preferably in the range of 1.5 to 10 μm, and more preferably in the range of 2 to 5 μm, and the thickness ratio of the base layer to the front layer or the back layer of the multilayer film is usually in the range of 9:1 to 6:1, preferably in the range of 9:1 to 7:3, and more preferably in the range of 9:1 to 8:2.

In the multilayer polypropylene film for a capacitor according to the present invention, the surface roughness Ra of the front layer or the back layer is preferably 0.2 μm or more and more preferably 0.3 μm or more. When the surface roughness Ra is 0.2 μm or more, the contact area between the films is reduced, which is preferable in terms of blocking resistance.

The multilayer polypropylene film for a capacitor according to the present invention preferably has a dielectric breakdown voltage (V/μm) at 100° C. of 540 V/μm or higher.

In the multilayer polypropylene film for a capacitor according to the present invention, no nucleating agent bleeds out to the surface.

<Method for Producing Multilayer Polypropylene Film for Capacitor>

The multilayer polypropylene film for a capacitor according to the present invention can be produced by various known methods, for example, by stretching a multilayer sheet obtained by co-extrusion molding the propylene polymer composition as a base layer and the propylene-based polymer (Y) as a front layer or a back layer. Examples of the method of stretching the multilayer sheet include a uniaxial stretching method and a biaxial stretching method. Here, a biaxial stretching method is preferable. Examples of the biaxial stretching method include: a sequential biaxial stretching method in which a film is uniaxially stretched in a machine direction and then stretched in a direction perpendicular to the machine direction; and a simultaneous biaxial stretching method in which the film is simultaneously stretched in the machine direction and a direction perpendicular to the machine direction. Specifically, a sequential biaxial stretching method (e.g., a tenter method, a tubular film method) or a simultaneous biaxial stretching method can be used.

The tenter method can be performed, for example, by the following procedure. A molten multilayer sheet melt-extruded from a T-die is solidified with a cooling roll usually in the range of 40 to 120° C., preferably 50 to 100° C., and more preferably 60 to 90° C. The resulting multilayer sheet is preheated as necessary and then introduced into a stretching zone. Next, the sheet is stretched 3 to 9 times at a temperature of 120 to 160° C. in the machine direction (longitudinal direction), and stretched 5 to 11 times at a temperature of 150 to 190° C. in a direction perpendicular to the machine direction (lateral direction). The total stretch area ratio is 30 to 80 times, preferably 35 to 75 times, more preferably 35 to 70 times, and still more preferably 35 to 50 times. When the stretch area ratio is less than 30 times, it may be difficult to obtain desired strength and thickness accuracy. In addition, when the stretch area ratio exceeds 80 times, breakage tends to occur during stretching, and productivity may be poor.

If necessary, heat fixation can be performed at 160 to 190° C. on a biaxially stretched multilayer polypropylene film for a capacitor. This makes it possible to produce a multilayer polypropylene film for a capacitor, which has, for instance, further improved thermal dimensional stability and abrasion resistance.

EXAMPLES

Hereinafter, the present invention will be more specifically described based on Examples. However, the present invention is not limited to these Examples. Note that protocols for measuring various physical properties described in Examples are as follows.

[Physical Properties of Propylene Homopolymer and Propylene-Based Polymer]

<Melt Flow Rate (MFR)>

The measurement was conducted according to ASTM D1238E at a temperature of 230° C. and a load of 2.16 kg.

<Meso Pentad Fraction (mmmm (Noise Removal Method))>

1. Measurement Conditions

Apparatus: AVANCE III cryo-500 nuclear magnetic resonance apparatus, manufactured by Bruker BioSpin Measured nucleus: $^{13}C$ (125 MHz)

Measurement mode: Single pulse proton broadband decoupling

Pulse width: 45° (5.00 microsec)

Repeat time: 5.5 s

Number of scans: 256 times

Measurement solvent: o-dichlorobenzene/deuterated benzene (80/20 vol %) mixed solvent Sample concentration: 50 mg/0.6 mL Measurement temperature: 120° C.

Chemical shift standard: 21.59 ppm (meso pentad methyl peak shifts)

2. Calculation Procedure

The meso pentad fraction (mmmm, %), which is one of indicators of the tacticity of polymer and in which the microtacticity of polymer was examined, was calculated from the peak intensity ratio of the 13C-NMR spectrum obtained under the measurement conditions of the above section 1.

Here, in a case of polypropylene having an unprecedented level of high tacticity like an analyte to be measured in the present invention, the present inventors assume that, if rmmr, mmrm, rmrr, rmrm, and mrrr regions are included in the integrated value, the degree of influence of "noise" on the integrated value is increased, which leads to a problem that S2 in a general calculation method is overestimated, that is, mmmm (%) is underestimated. Prog. Polym. Sci. 26 (2001), 443-533 has reported that in the case of polypropylene having a tacticity of 95% or more, if certain requirements are satisfied, the integrated value for the rmmr, mmrm, rmrr, rmrm, and mrrr regions is theoretically 0.1% or less in total. This suggests that the above leads to overestimation of S2 in a general calculation method.

Therefore, in the present invention, calculation was performed according to the following (Equation 1). The rmmr, mmrm, rmrr, rmrm, and mrrr regions were removed from the calculation according to the suggestion of Prog. Polym. Sci. 26 (2001), 443-533. Hereinafter, the calculation method herein is referred to as a "noise removal method".

$$mmmm(\text{noise removal method})(\%) = S1/S2*100 \quad \text{(Equation 1)}$$

$$S1 = (\text{Peaks containing } mmmm \text{ and } mmmr) - (n\text{-}propyl\text{-terminal}) - (n\text{-}butyl\text{-terminal}) - mrrm*2$$

$$S2 = S1 + mmmr + mmrr + mrrm + rrrr = S1 + 5*mrrm + rrrr$$

In calculating the above (Equation 1), the following assignment was made as an example. Note that in the peak of mmmm, respective peaks of mmmr, (n-propyl-terminal), and (n-butyl-terminal) overlap with each other.

Peaks including mmmm and mmmr: peak area between 21.2 and 22.0 ppm mmmr=mrrm*2 mmrr=mrrm*2 mrrm: peak area between 19.5 and 19.7 ppm rrrr: peak area between 20.0 and 20.2 ppm n-propyl-terminal: (A1+A3)/2

A1: peak area of 14.2 ppm

A3: peak area of 39.4 ppm n-butyl-terminal: peak area of 36.7 ppm

<Ash Content>

The ash content is determined by putting pellets in a crucible, completely burning the pellets, allowing the pellets to be ash in the crucible at 800° C. for 2 h in an electric furnace, measuring the ash remaining in the crucible, and calculating the ash content (ppm).

<Chlorine Content>

First, 0.8 g of each sample was burned at 400 to 900° C. under an argon/oxygen stream by using a combustion apparatus, manufactured by Mitsubishi Kasei Corporation. Thereafter, the combustion gas was trapped with ultrapure water and a resulting mixture was concentrated, and the resulting concentrated sample solution was measured with a DIONEX-DX300 ion chromatograph (trade name, manufactured by NIPPON DIONEX K.K.) and an anion column AS4A-SC (trade name, manufactured by Dionex Corporation) to determine the chlorine content.

<Molecular Weight Distribution>

The Mw/Mn value, which is an index of the molecular weight distribution, was obtained by analyzing a chromatogram measured under the following conditions by a known procedure.

Apparatus: Alliance GPC 2000 model, a gel permeation chromatograph, manufactured by Waters Corporation Column: TSKgel GMH6-HTx2+TSKgel GMH6-HTLx2, manufactured by Tosoh Corporation Mobile phase: o-dichlorobenzene (containing 0.025% BHT)

Flow rate: 1.0 ml/min

Temperature: 140° C.

Column calibration: monodisperse polystyrene, manufactured by Tosoh Corporation

Sample concentration: 0.15% (w/v)

Injection volume: 0.4 mL

<<Production of Propylene Polymer Composition Containing Propylene Homopolymer and Polymer-Based α-Crystal Nucleating Agent>>

The propylene polymer composition containing the polymer-based α-crystal nucleating agent used in Examples was produced in the following Production Examples.

Production Example 1

<<Preparation of Solid Titanium Catalyst Component>>

A 4.5-$m^3$ reactor was charged with 240 kg of anhydrous magnesium chloride, 1100 L of decane, and 990 kg of 2-ethylhexyl alcohol, and heated at 130° C., to give a homogeneous solution. Thereafter, 54 kg of phthalic anhydride was added to this solution, and the mixture was further stirred at 130° C. to allow phthalic anhydride to dissolve. The homogeneous solution thus obtained was cooled to room temperature, and then the whole amount of the homogeneous solution was added dropwise to titanium tetrachloride (6.7 $m^3$) kept at −25° C. under stirring. The temperature after the end of addition was about −20° C. Next, the temperature of the resulting mixed liquid was raised to 110° C. over 4 h, and when the temperature reached 110° C., 13 kg of diisobutyl phthalate (DIBP) was added, then the resulting mixture was kept stirred at the same temperature for 2 h. After the completion of the 2-h reaction, a resulting solid part was collected by thermal filtration, and this solid part was resuspended in 7.3 $m^3$ of titanium tetrachloride, and then subjected to a heating reaction again at 110° C. for 2 h. After completion of the reaction, the solid part was collected again by thermal filtration, and sufficiently washed with decane and hexane at 110° C. until no free titanium compound was detected in the washed solution. The above operation gave a solid titanium catalyst component (A).

The composition of the obtained solid titanium catalyst component (A) is as follows: titanium: 2.2 wt %, chlorine: 61 wt %, magnesium: 19 wt %, and DIBP: 12.7 wt %.

<Preparation of Prepolymerization Catalyst>

First, 40 L of purified hexane, 3.0 mol of triethylaluminum, 3.0 mol of trimethylmethoxysilane, and 0.3 mol of the solid titanium catalyst component (A) in terms of titanium atoms were added to a 80-L reactor equipped with a stirrer under a nitrogen atmosphere. Thereafter, at a temperature of 20° C., 1.5 kg of 3-methyl-1-butene (3 MB-1) was supplied into the reactor and prepolymerization was carried out for 2 h. After completion of the reaction, the inside of the reactor was replaced with nitrogen, and a washing operation including removal of the supernatant and addition of purified hexane was repeated three times to give a prepolymerization catalyst (B) containing 3 MB-1 as a polymer α-crystal nucleating agent. The prepolymerization catalyst (B) was resuspended in purified hexane and stored.

<Polymerization of Propylene>

First, a 1000-L reactor equipped with a stirrer was charged with 450 L of purified n-hexane, and, in a propylene atmosphere at 60° C., charged with 500 mmol of triethylaluminum, 500 mmol of dicyclopentyldimethoxysilane, and 10 mmol Ti of the prepolymerization catalyst (B) in terms of titanium atoms. Then, 250 L of hydrogen was introduced, the temperature was raised to 80° C., and propylene was polymerized while the temperature was maintained for 4 h. The pressure during polymerization was kept at 6 kg/$cm^2$G. After completion of the polymerization, the resulting product was depressurized, and a slurry containing the produced solid was centrifuged and dried with a drier, to give 200 kg of a white powdery polymer-based α-crystal nucleating agent-containing propylene polymer composition.

The obtained polymer-based α-crystal nucleating agent-containing propylene polymer composition had a melt flow rate of 2 g/10 min. The value for the tacticity index [M5] of a boiling heptane insoluble component was 0.986. The content of the 3 MB-1 polymer as a polymer α-crystal nucleating agent was 300 ppm, and the density was 0.919 $g/cm^3$.

The melting point of the 3 MB-1 polymer was 310° C.

The polymer-based α-crystal nucleating agent-containing propylene polymer composition obtained in present Production Example 1 is a composition containing a propylene homopolymer (X1), which is a propylene homopolymer (X), and 300 ppm of 3 MB-1 polymer, which is a polymer-based α-crystal nucleating agent (C). In Examples, the composition was defined as propylene polymer composition (Z).

Note that the propylene polymer composition (Z) was blended with 0.2 parts by mass of 3,5-di-t-butyl-4-hydroxytoluene as an antioxidant, 0.65 parts by mass of tetrakis [methylene-3(3,5-di-t-butyl-4-hydroxyphenyl)propionate] methane as an antioxidant, and 0.005 parts by mass of calcium stearate as a neutralizing agent, based on 100 parts by mass of the composition. By using a single screw extruder, the composition resin was pelletized by melt-kneading at a resin temperature of 230° C. Note that the single screw extruder used was a GMZ50-32 (L/D=32), manufactured by GM ENGINEERING Co., Ltd.

Table 1 shows the physical properties of the propylene homopolymer (X1-1), which is the propylene homopolymer (X1) included in the obtained propylene polymer composition (Z).

Propylene Polymer Used in Examples and Comparative Examples

Production of Propylene Homopolymer

Production Example 2

<Preparation of Solid Titanium (a-1)>

A 2-L high-speed stirring apparatus (manufactured by Tokushu Kika Kogyo Co., Ltd.) was sufficiently purged with nitrogen. Thereafter, the apparatus was charged with 700 ml of purified kerosene, 10 g of magnesium chloride, 24.2 g of ethanol, and 3 g of sorbitan distearate ("EMASOL 320", manufactured by Kao Atlas Co., Ltd.). The system was heated under stirring and stirred under conditions at 120° C. and 800 rpm for 30 min. Under high-speed stirring, by using a Teflon (registered trademark) tube having an inner diameter of 5 mm, the resulting mixture was transferred to a 2-L glass flask (with a stirrer) charged with 1 L of purified kerosene cooled to −10° C. in advance. The resulting solid was filtered and sufficiently washed with purified n-hexane to give a solid adduct in which 2.8 mol of ethanol was coordinated with 1 mol of magnesium chloride.

Subsequently, the solid adduct (45 mmol in terms of magnesium atoms) was suspended in 20 ml of decane, and then the whole amount of the resulting mixture was introduced into 195 ml of titanium tetrachloride maintained at −20° C. under stirring. The mixed liquid was heated to 80° C. over 5 h, and 1.8 ml (6.2 mmol) of diisobutyl phthalate was added. Subsequently, the temperature was raised to 110° C. and the mixture was stirred for 1.5 h.

After completion of the 1.5-h reaction, a solid part was collected by thermal filtration, and washed with decane at 100° C. and hexane at room temperature until no titanium was detected in the filtrate. In this way, solid titanium (a-1) containing 3.8 mass % of titanium, 16 mass % of magnesium, 18.2 mass % of diisobutyl phthalate, and 1.1 mass % of an ethanol residue was obtained.

<Preparation of Solid Titanium Catalyst Component (i-1)>

To a 200-ml glass reactor sufficiently purged with nitrogen were added 6.8 g of the obtained solid titanium (a-1), 113 ml of para-xylene, 11 ml of decane, 2.5 ml (23 mmol) of titanium tetrachloride, and 0.34 ml (1.2 mmol) of diisobutyl phthalate. The temperature in the reactor was raised to 130° C. The mixture was stirred at that temperature for 1 h and subjected to contact treatment, and a solid part of the resulting mixture was then collected by thermal filtration. This solid part was resuspended in 101 ml of para-xylene, and 1.7 ml (15 mmol) of titanium tetrachloride and 0.22 ml (0.8 mmol) of diisobutyl phthalate were further added.

Subsequently, the temperature was raised to 130° C., and the reaction was carried out with stirring for 1 h while the temperature was maintained. After completion of the reaction, solid-liquid separation was performed again by thermal filtration, and the obtained solid part was washed with decane at 100° C. and hexane at room temperature until para-xylene in the catalyst became 1 mass % or less. In this way, a solid titanium catalyst component (i-1) containing 1.3 mass % of titanium, 20 mass % of magnesium, and 13.8 mass % of diisobutyl phthalate was obtained.

<Preparation of Prepolymerization Catalyst (p-1)>

First, a 200-mL glass reactor purged with nitrogen was charged with 50 ml of hexane, 2.5 mmol of triethylaluminum, 0.5 mmol of cyclopentyldiethylaminodimethoxysilane, and 0.25 mmol of the solid titanium catalyst component (i-1) obtained above in terms of titanium atoms. Thereafter, propylene was supplied in an amount of 1.47 L/h for 1 h while the temperature in the system was kept at 20° C. This operation gave a prepolymerization catalyst (p-1) in which 3 g of propylene is prepolymerized per g of the solid titanium catalyst component (i-1).

<Main Polymerization>

To a 2-L autoclave were added 500 g of propylene and 3.5 L of hydrogen, and the temperature in the system was raised to 60° C. Thereafter, 1.4 mmol of triethylaluminum, 0.7 mmol of cyclopentyldiethylaminodimethoxysilane, and 0.0028 mmol of the prepolymerization catalyst (p-1) obtained above in terms of titanium atoms were added to initiate polymerization. The polymerization was performed for 1 h while the temperature in the system was kept at 70° C. Next, the polymerization was stopped by adding ethanol, and unreacted propylene was purged, to give 248 g of propylene homopolymer.

The same operation was repeated multiple times, to give a total of 5 kg of the propylene homopolymer. To 1 kg of the resulting propylene homopolymer were added 0.6 g of pure water and 5.4 mL of propylene oxide. The resulting mixture was subjected to dechlorination treatment at 90° C. for 2 h and then to vacuum drying at 80° C. to give propylene homopolymer powder. Table 1 shows the results of evaluating the physical properties of the propylene homopolymer obtained.

Note that in the present invention, the propylene-based polymer (Y) used for the front layer contained the propylene homopolymer (X). When the propylene homopolymer obtained in Production Example 2 was used as the front layer, the propylene homopolymer was expressed as a propylene-based polymer (Y1). When the propylene homopolymer was used as part of the propylene polymer composition containing the polymer-based α-crystal nucleating agent and being used as the base layer, the propylene homopolymer (X2) was expressed as a propylene homopolymer (X2-1).

Table 1 shows the physical properties of the propylene homopolymer (X2-1), the propylene homopolymer (X1-1), and the propylene-based polymer (Y1). The propylene homopolymer (X2-1) and the propylene-based polymer (Y1) are an identical propylene homopolymer.

<Formulation and Granulation of Additives>

Next, 100 parts by mass of the obtained propylene homopolymer was dry-blended with 0.2 parts by mass of 3,5-di-tert-butyl-4-hydroxytoluene as an antioxidant, 0.2 parts by mass of tetrakis[methylene-3(3,5-di-tert-butyl-4-hydroxyphenyl)propionate]methane as an antioxidant, and 0.01 parts by mass of calcium stearate as a neutralizing agent. Then, by using a single screw extruder, the composition resin was pelletized by melt-kneading at a resin temperature of 230° C. Note that the single screw extruder used was a GMZ50-32 (L/D=32), manufactured by GM ENGINEERING Co., Ltd.

The physical properties of the propylene homopolymer (X1), the propylene polymer composition (Z), and the propylene homopolymer (X2) as obtained in Production Example 1 or Production Example 2 were measured by the measurement protocol described above. Table 1 shows the results.

TABLE 1

| | | Propylene polymer | | |
|---|---|---|---|---|
| Physical property | Unit | X2-1 | X1-1 | Y1 |
| MFR | g/10 min | 4.5 | 2 | 4.5 |
| mmmm | — | 0.97 | 0.97 | 0.97 |
| Ash | ppm | 20 | 20 | 20 |
| Chlorine | ppm | <1 | <1 | <1 |
| Mw/Mn | — | 10 | 6 | 10 |
| Comonomer | mol % | 0 | 0 | 0 |

Example 1

<Preparation of Original Fabric Sheet>

The propylene homopolymer (Y1) obtained in Production Example 2 was used as the propylene polymer (Y) for forming the front and back layers. The propylene polymer composition (Z) containing the polymer-based α-crystal nucleating agent as obtained in Production Example 1 was used as the propylene polymer composition for forming the base layer (intermediate layer). Each material was melted at a temperature of 270° C. with a multilayer T die sheet molding machine for three-layered sheet of 2 types of polymers (25 mmφ/30 mmφ) (manufactured by GM ENGINEERING Co., Ltd.) and then extruded from the multilayer T die sheet molding machine. A resulting multilayer sheet was cooled with one cooling roll that was kept at a chill roll temperature of 65° C. under conditions at a tensile speed of 1.0 m/min, to give an original fabric sheet having a thickness of 315 μm. At that time, the thickness ratio among the intermediate layer and the front and back layers in the original fabric sheet was such that the front layer:intermediate layer:back layer was 1:8:1.

<Production of Multilayer Polypropylene Film for Capacitor>

The obtained original fabric sheet was cut into 95 mm×95 mm, and biaxially stretched under conditions below, to give a multilayer biaxially stretched film (multilayer polypropylene film for a capacitor) having a thickness of 7 μm. The thickness was adjusted by changing the preheating temperature.

<Stretching Conditions>

Stretching apparatus: KARO IV (trade name, manufactured by Brückner Maschinenbau GmbH & Co.KG)

Preheating temperature: 153 to 162° C.

Preheating time: 60 s

Stretching ratio: sequential biaxial stretching (stretch area ratio: 45 times): 5 times in the longitudinal direction (machine direction)×9 times in the lateral direction Stretching speed: 6 m/min The physical properties of each obtained film were evaluated according to the following procedures. Table 2 shows the results.

[Physical Properties of Multilayer Polypropylene Film for Capacitor]

<Bleeding Amount>

Each material is melted at 270° C. with a 25 mmφ/30 mmφmultilayer T die sheet molding machine (manufactured by GM ENGINEERING Co., Ltd.). Thereafter, the resulting materials are extruded and cooled with one cooling roll kept at 65° C. at a tensile speed of 1.0 m/min, to give an original fabric sheet having a thickness of 315 μm. The obtained original fabric sheet is aged in an oven heated to 120° C. for 48 h. The original fabric sheet after aging is cut into 30 cm×18 cm in length×width. Both surfaces of each of the 10 cut sheets are washed with dichloromethane and resulting washings are collected. The washed and collected material after desolvation is weighed, and this weight is defined as the total bleeding amount. The washed and collected material is also subjected to HPLC (UV 254 nm) to quantify the nucleating agent.

<Surface Roughness>

Measurement was performed according to JIS B0601-1994.

<Breakdown Voltage (BDV)>

The BDV of each obtained stretched film was measured in accordance with JIS-C2330. The dielectric breakdown voltage of the biaxially stretched film was measured at 100° C. and 120° C. The breakdown voltage (BDV, V/μm) was calculated by dividing the dielectric breakdown voltage by the film thickness.

<Internal Haze>

A test piece of each obtained stretched film was immersed in a glass cell containing cyclohexanol, and the haze was measured in accordance with JIS K7136.

<Surface Roughness>

The average surface roughness Ra of the surface layer of each obtained stretched film in the MD direction was measured for n=3 at a measurement speed of 0.15 mm/min by using a surface roughness meter in accordance with JIS-B0601:1994, and the arithmetic average was then calculated.

Example 2

The same procedure as in Example 1 was repeated, except that instead of the propylene polymer composition for forming the base layer (intermediate layer) as used in Example 1, a propylene polymer composition obtained by blending 6 parts by mass of the propylene polymer composition (Z) used in Example 1 and 94 parts by mass of the propylene homopolymer (X2-1) obtained in Production Example 2 was used, to give a multilayer polypropylene film for a capacitor.

Table 2 shows the evaluation results.

Example 3

The same procedure as in Example 1 was repeated, except that instead of the propylene polymer composition for forming the base layer (intermediate layer) as used in Example 1, a propylene polymer composition obtained by blending 3 parts by mass of the propylene polymer composition (Z) used in Example 1 and 97 parts by mass of the propylene homopolymer (X2-1) obtained in Production Example 2 was used, to give a multilayer polypropylene film for a capacitor.

Table 2 shows the evaluation results.

Comparative Example 1

The same procedure as in Example 1 was repeated, except that instead of the propylene polymer composition for forming the base layer (intermediate layer) as used in Example 1, a propylene-based homopolymer (X2-1) obtained in Production Example 2 was used alone, to give a three-layered multilayer polypropylene film for a capacitor, the film being made of one type of the propylene-based homopolymer (X2-1) as the base layer and the front and back layers.

Table 2 shows the evaluation results.

Comparative Example 2

The same procedure as in Example 1 was repeated, except that instead of both the surface layers and the intermediate layer (base layer) as used in Example 1, the front and back layers and the intermediate layer (base layer) used included a composition (W1) containing 100 parts by mass of the propylene-based homopolymer (X2-1) and, as a crystal nucleating agent, 0.05 parts by mass of an organic α-crystal nucleating agent (trade name: NX8000J, manufactured by Milliken & Company], to give a three-layered multilayer polypropylene film for a capacitor, the film being made of one type of the above composition as the base layer and the front and back layers.

Table 2 shows the evaluation results.

Comparative Example 3

The same procedure as in Example 1 was repeated, except that instead of the front and back layers and the intermediate layer (base layer) as used in Example 1, the front and back layers and the intermediate layer (base layer) used included a composition (W2) containing 100 parts by mass of the propylene-based homopolymer (X2-1) and, as a crystal nucleating agent, 0.1 parts by mass of an organic α-crystal nucleating agent (trade name: NX8000J, manufactured by Milliken & Company], to give a three-layered multilayer polypropylene film for a capacitor, the film being made of one type of the above composition as the base layer and the front and back layers.

Table 2 shows the evaluation results.

Comparative Example 4

The same procedure as in Example 1 was repeated, except that instead of the front and back layers and the intermediate layer (base layer) as used in Example 1, both the surface layers and the intermediate layer (base layer) used included a propylene polymer composition obtained by blending 3 parts by mass of the propylene polymer composition (Z) used for the base layer (intermediate layer) in Example 3 and 97 parts by mass of the propylene homopolymer (X2-1) obtained in Production Example 2, to give a three-layered multilayer polypropylene film for a capacitor, the film being made of one type of composition.

Table 2 shows the evaluation results.

Comparative Example 5

The same procedure as in Example 1 was repeated, except that instead of the propylene polymer composition for forming the base layer (intermediate layer) as used in Example 1, a composition (W2) containing 100 parts by mass of the propylene-based homopolymer (X2-1) used in Comparative Example 1 and 0.1 parts by mass of an organic α-crystal nucleating agent [trade name: NX8000J, manufactured by Milliken & Company] was used, to give a three-layered multilayer polypropylene film for a capacitor, the film being made of two types of compositions.

Table 2 shows the evaluation results.

TABLE 2

| | | | Ex1 | Ex2 | Ex3 |
|---|---|---|---|---|---|
| Nucleating agent component | | +/− | + | + | + |
| | | Kind | Polymer-based α-crystal nucleating agent | Polymer-based α-crystal nucleating agent | Polymer-based α-crystal nucleating agent |
| | | Content (ppm) | 300 | 18 | 9 |
| Original fabric sheet | Layer structure | | 2-types 3-layers | 2-types 3-layers | 2-types 3-layers |
| | Constituting resin | Front layer | Y1 | Y1 | Y1 |
| | | Base layer | Composition (Z) | X2-1 + Composition (Z) | X2-1 + Composition (Z) |
| | | Back layer | Y1 | Y1 | Y1 |
| | Surface bleeding | Nucleating agent amount (mg/1000 $cm^2$) | N.D. | N.D. | N.D. |
| Stretched film | Internal haze (%) | | 0.7 | 0.7 | 0.8 |
| | Surface roughness Ra (μm) | | 0.29 | 0.29 | 0.29 |
| | Blocking resistance evaluation | | ○ | ○ | ○ |

TABLE 2-continued

| | | | | |
|---|---|---|---|---|
| Dielectric breakdown voltage (V/μm) | 100° C. | 594 | 560 | 543 |

| | | | CEx1 | CEx2 | CEx3 | CEx4 | CEx5 |
|---|---|---|---|---|---|---|---|
| Nucleating agent component | | +/− | − | + | + | + | + |
| | | Kind | — | Organic α-crystal nucleating agent | Organic α-crystal nucleating agent | Polymer-based α-crystal nucleating agent | Organic α-crystal nucleating agent |
| | | Content (ppm) | — | 500 | 1000 | 9 | 1000 |
| Original fabric sheet | Layer structure | | 1-type 3-layers | 1-type 3-layers | 1-type 3-layers | 1-type 3-layers | 2-types 3-layers |
| | Constituting resin | Front layer | Y1 | Composition (W1) | Composition (W2) | X2-1 + Composition (Z) | Y1 |
| | | Base layer | X2-1 | Composition (W1) | Composition (W2) | X2-1 + Composition (Z) | Composition (W2) |
| | | Back layer | Y1 | Composition (W1) | Composition (W2) | X2-1 + Composition (Z) | Y1 |
| | Surface bleeding | Nucleating agent amount (mg/1000 $cm^2$) | N.D. | 0.30 | 0.70 | N.D. | 0.60 |
| Stretched film | Internal haze (%) | | 1.5 | 1.2 | 0.5 | 0.1 | 1.4 |
| | Surface roughness Ra (μm) | | 0.30 | 0.16 | 0.08 | 0.12 | 0.25 |
| | Blocking resistance evaluation | | ○ | Δ | X | Δ | Δ |
| | Dielectric breakdown voltage (V/μm) | 100° C. | 484 | 531 | 462 | 436 | 541 |

The invention claimed is:

1. A multilayer polypropylene film for a capacitor comprising a base layer composed of a propylene polymer composition containing a propylene homopolymer (X) and 0.0001 to 0.05 mass % of a polymer-based α-crystal nucleating agent (C), and a front layer on one side of the base layer and a back layer on the other side of the base layer,
   - wherein the front layer and the back layer consist of a propylene-based polymer (Y) or of the propylene-based polymer (Y) and an additive selected from the group consisting of an antioxidant and calcium sterate,
   - wherein the base layer, the front layer, and the back layer are stretched, and
   - wherein a surface roughness Ra of the front layer and of the back layer is 0.2 μm or more.

2. The multilayer polypropylene film for a capacitor according to claim 1, wherein the propylene-based polymer (Y) that forms the front layer and the back layer has a content of a polymer-based α-crystal nucleating agent being less than 0.00001 mass %.

3. The multilayer polypropylene film for a capacitor according to claim 1, wherein the polymer-based α-crystal nucleating agent (C) is a polymer having a glass transition temperature and/or a melting point (Tm) of 280° C. or higher.

4. The multilayer polypropylene film for a capacitor according to claim 1, wherein the propylene homopolymer (X) satisfies the following requirements (1) to (5):
   - (1) having a melt flow rate (MFR) (ASTM D1238, at 230° C., under a load of 2.16 kg) of in the range of 1 to 10 g/10 min,
   - (2) having a mmmm determined by 13C-NMR of in the range of 0.930 to 0.999,
   - (3) having an ash content of 50 ppm by mass or less,
   - (4) having a chlorine content of 5 ppm by mass or less, and
   - (5) having a ratio (Mw/Mn) of weight average molecular weight (Mw) to number average molecular weight (Mn) as measured by gel permeation chromatography (GPC) being in the range of 4.5 to 12.0.

5. The multilayer polypropylene film for a capacitor according to claim 1, wherein the propylene-based polymer (Y) is a polymer-based α-crystal nucleating agent (C)-free polymer or a propylene homopolymer having a content of the polymer-based α-crystal nucleating agent (C) being less than 0.00001 mass %.

* * * * *